United States Patent [19]

Woolfolk

[11] Patent Number: 4,726,188
[45] Date of Patent: Feb. 23, 1988

[54] MOTOR UTILIZING BUOYANCY FORCES

[76] Inventor: Martin Y. Woolfolk, 3601 Old Baker Rd., Zachary, La. 70807

[21] Appl. No.: 7,938

[22] Filed: Jan. 28, 1987

[51] Int. Cl.⁴ .............................................. F03B 17/02
[52] U.S. Cl. ........................................ 60/496; 417/337
[58] Field of Search ................... 60/495, 496; 417/337

[56] References Cited

U.S. PATENT DOCUMENTS 4,185,464  1/1980  Rainey ................................. 60/496
4,404,801  9/1983  Palm ................................... 60/496

Primary Examiner—Stephen F. Husar
Attorney, Agent, or Firm—William David Kiesel; Robert C. Tucker

[57] ABSTRACT

A motor utilizing, at least in part, buoyancy forces of different materials in a fluid is disclosed characterized by a piston assembly that requires only a single level fluid pool utilizing no pump to operate.

1 Claim, 2 Drawing Figures

MOTOR UTILIZING BUOYANCY FORCES

PRIOR ART

1. Field of the Invention

This invention relates, in general, to motors and, more particularly, to motors utilizing, at least in part, buoyancy forces of different materials in a fluid to provide the energy to operate the motor.

2. Prior Art

Many systems have been devised which attempt to utilize the buoyancy forces of different material in a fluid such as water. One such example is seen in U.S. Pat. No. 2,537,143 issued to A. J. Levin on Jan. 9, 1951 entitled "Variable Buoyancy Lift". However, such systems require substantial external energy to be utilized so that much of the advantages gained with such systems is lost. Another example is seen in U.S. Pat. No. 3,961,479 issued to Ray C. Anderson on June 8, 1976 and entitled "Energy Converting Hydraulic Buoyant Motor". However, this, and similar systems, require the ability to drain the fluid, usually water, from a higher level to a lower level and, therefore, are only workable in certain type physical locations or, they require pumps to pump the drained fluid to the original higher level. Other multi-level fluid motors are disclosed in U.S. Pat. Nos. 1,550,408, 3,961,480, 4,083,186, 4,185,464, 4,207,741, 4,309,154 and 4,404,801.

SUMMARY OF THE INVENTION

Therefore, it is an object of this invention to provide a motor which utilizes bouyancy forces to generate power.

Another object of this invention is to provide a motor which utilizes, principally, bouyancy forces and requires little or no external energy sources to generate power.

Still another object of this invention is to provide a motor which utilizes, principally, bouyancy forces generated from a uni-level fluid source and does not require a lower level fluid pool to receive fluids from a higher level.

A further object of this invention is to provide a motor which utilizes, principally, bouyancy forces and does not require pumps to move fluids to various levels.

A still further object of this invention is to provide a highly energy efficient motor which utilizes, principally, bouyancy forces.

Accordingly, a motor utilizing bouyancy forces is provided comprising an enclosed hollow body positioned in a pool of liquid; and body having an opening in the upper portion of its vertical wall, a second opening in the lower portion of its vertical wall, a third opening in its bottom surface, and a piston means co-axially positioned in said hollow body comprising: a piston head vertically movable along said vertical wall in sealing contact to form an upper cavity and a lower cavity within said body, shaft extending through the upper surface of said body, a piston shaft attached at one end to said piston head and extending upward through the upper surface of said hollow body and being of sufficient length to allow said piston head to extend below said second opening, a hollow float attached to the other end of said piston shaft outside of said hollow body and having a flooding opening and draining opening, a valve assembly operatively connected to said second opening, said flooding opening and said draining opening to independently open and close said second opening, said flooding opening and said draining opening, a first locking means attached to said hollow body to lock and unlock said hollow float in position relative to said hollow body at a pre-determined time, a second locking means attached to said hollow body to lock and unlock said hollow body in position relative to the bottom of said pool of liquid at a second pre-determined time, a flexible hose attached at one end to said third opening and having its opposite end extending above the pool of liquid to allow the air to flow to and from said lower cavity to the atmosphere above said pool of liquid, and a flexible line attached at one end to the bottom of said hollow body and extending toward said bottom of said pool of liquid and attached at its opposite end to said power receiving means.

PREFERRED EMBODIMENTS OF THE INVENTION

Figure 1:
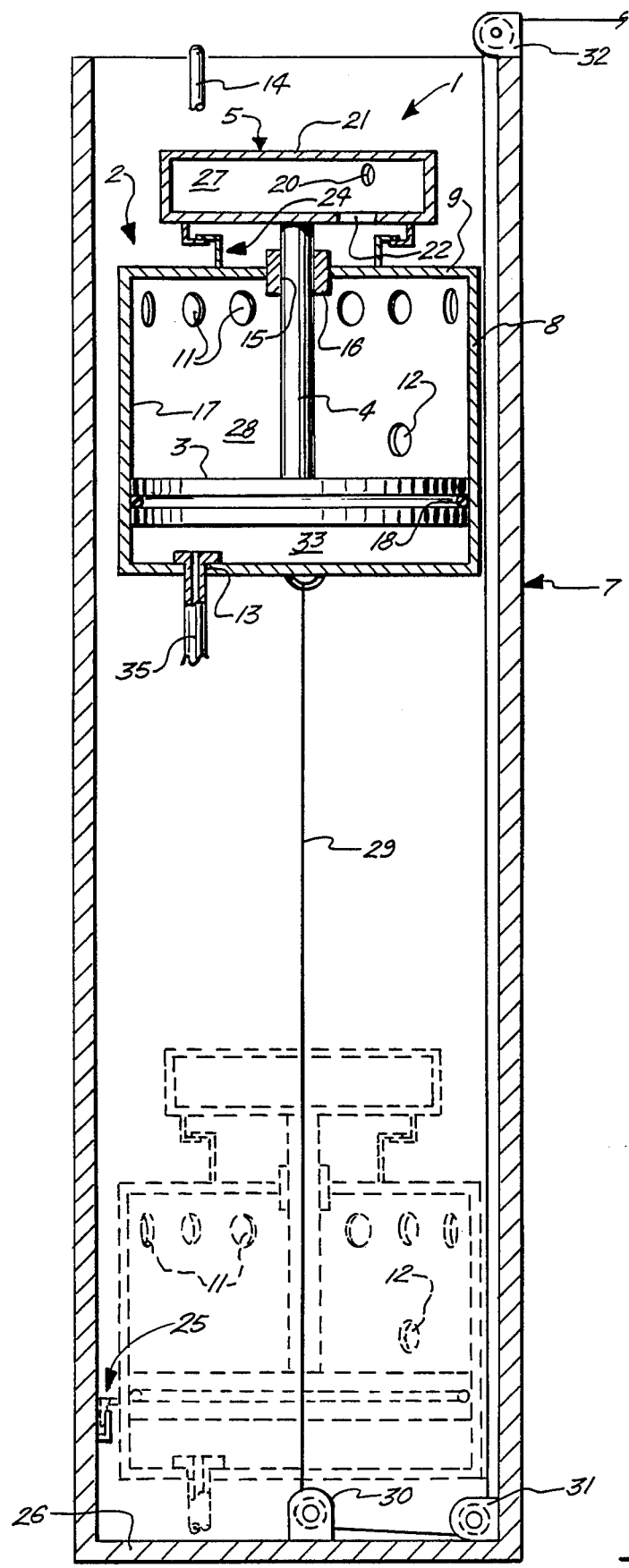
FIG. 1 is a cross-sectional view of one embodiment of a preferred embodiment of the buoyancy motor in the position just prior to descent in the tank and shown in phantom lines the buoyancy motor in the position just prior to ascent in the tank.

Referring now to FIG. 1 the motor denoted generally by the numeral 1 comprises in general a hollow body 2 containing a piston assembly comprising piston head 3, piston shaft 4 and hollow float 5 all of which are positioned in a pool of liquid 6, e.g. water, which is in a preferred embodiment contained in tank 7.

Body 2 has a circular cross-section formed by vertical wall 8, ceiling section 9 and floor section 10. Vertical wall 8 is provided with opening 11 located in the upper part of vertical wall 8 and opening 12 located in the lower part of vertical wall 8 as shown in FIG. 1. Floor section 10 is provided with an opening 13 to which a flexible hose 14 is connected at one end and has its other end 35' positioned outside tank 7 so as to allow air to pass throught hose 14 into tank 7 and out of tank 7, as desired. Ceiling section 9 is provided with an opening 15 to allow piston shaft 4 to pass as explained below. In a preferred embodiment, bushing 16 is fitted in opening 15 so as to form a seal and to allow piston shaft 4 to vertically slide in opening 15.

Piston head 3 is shaped to vertically move adjacent to the interior surface 17 of vertical wall 8. Sealing ring 18 extends about the outer circumference of piston head 3 and is positioned in groove 19 so that sealing ring 18 is in sealing contact with interior surface 17.

Piston shaft 4 extends perpendicularly from the upper surface of piston head 3 and through bushing 16. Piston shaft 4 is of sufficient length that even when piston head 3 is at its lowest position as shown in FIG. 1 it extends outside body 2. Attached to the other end of piston shaft 4 is hollow float 5. Flood opening 20 is provided in vertical wall 21 of the hollow float. In addition there is a drain opening 22 located in the floor section of the hollow float.

Conventional detention means, denoted generally by the numberal 24, are connected to hollow float 5 in a manner to fix its position relative to body 2 at a pre-determined time. Examples of such detention means would include variations of a spring member co-acting with a detent block such as shown in U.S. Pat. No. 3,961,479, conventional fluid pressure operated or timed locking systems or conventional electro-magnetic operated systems.

A second detention means 25 is provided to fix the position of hollow body relative to tank bottom 26 as discussed hereinbelow.

Conventional actuatable valves 35 and 36 are operatively connected to lower opening 12 and flood opening 20 to permit the entry of fluid from tank 7 into body chamber 28 and float chamber 27, respectively, at a pre-determined time in the cycle of motor 1. In addition a conventional actuatable valve (not shown) is operatively connected to drain opening 22 to permit fluid which is permitted to flow into hollow float chamber 27 at one point in the power cycle to escape chamber 27.

Attached to the bottom of body 2 is a flexible line 29 that extends downward and about pulley assemblies 30 and 31 attached to the tank bottom 26 and then upward and about pulley assembly 32 as shown where it is operatively connected at its opposite end to the device (not shown), such as a fly wheel, that is to receive the power generated by motor 1.

Figure 2:
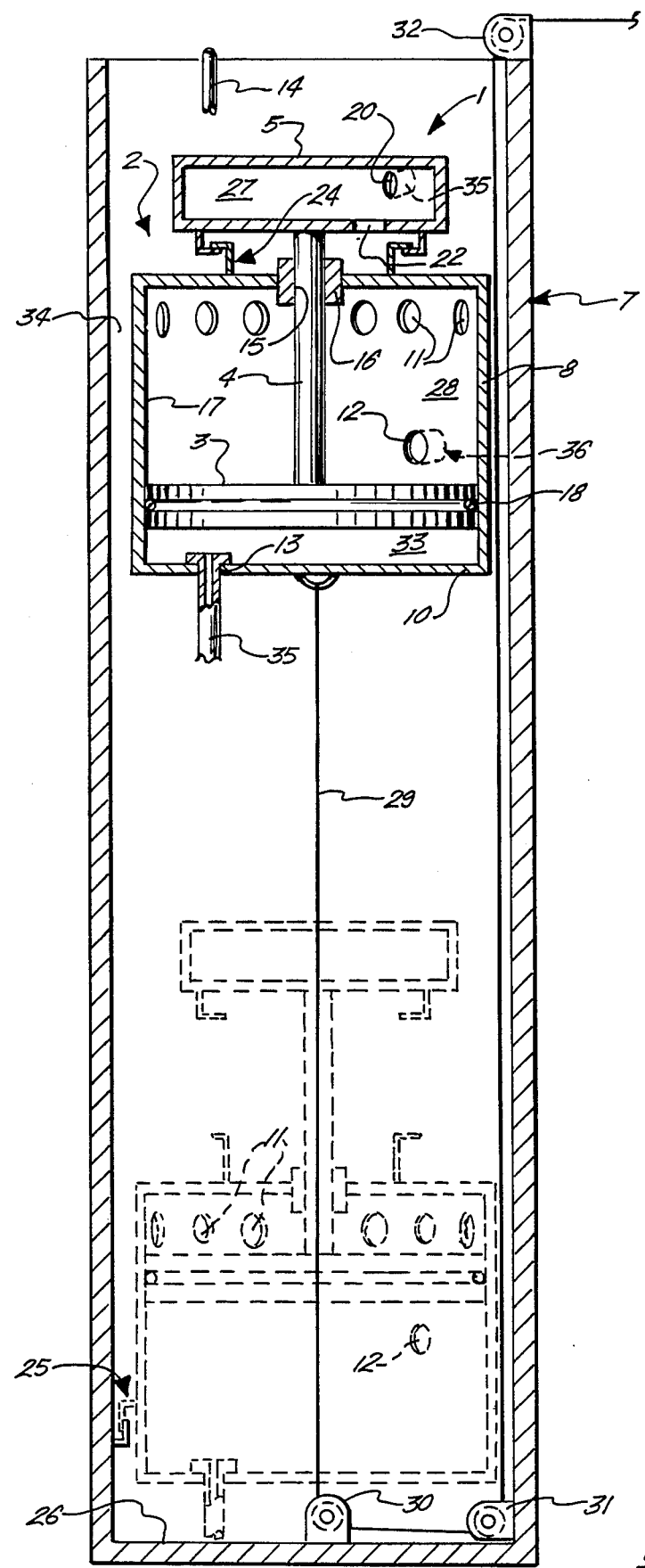
FIG. 2 is a cross-sectional view of a similar embodiment of the buoyancy motor in the position as it is about to begin its ascent in the tank, and shown in solid lines in the position just prior to the first position in FIG. 1.

Turning now to the operation of motor 1 as first seen in FIG. 1, hollow float 5 is locked in position relative to body 2 by detention means 24. At this stage of the cycle, chamber 27, chamber 28 and chamber 33 are filled with air at atmospheric pressure. These chambers are sized to provide a positive buoyancy to motor 1 when in this position. The valve 35 controlling the entry of fluids from tank 7 through opening 12 is then actuated to allow fluid to flow into chamber 28. As chamber 28 fills with fluid, body 2 begins to descend toward tank bottom 26 until it reaches the position indicated by the dotted lines in FIG. 1. Retention means 25 is then activated to retain body 2 in that position. Next retention means 24 is disengaged which results in hollow float 5 rising due to the buoyancy forces because chamber 33 is connected through hose 14 to the atmosphere outside of tank 7 and the fluid in chamber 28 is permitted to escape into tank 7 through opening 11. Retention means 25 is then deactivated. As a result body 2 begins to rise as a result of the buoyancy forces. After body 2 has risen a pre-determined distance the valve 36 operatively connected to flood opening 20 is activated to permit fluid to enter chamber 27. The timing is such to permit the flooding of chamber 27 and the closing of the valve to opening 20 before float 5 reaches the surface 34 of the fluid pool. In order to achieve this timing it is desired to correlate the sizes of chambers 28 and 33 during the ascent of body 2. Further chamber 28 should be of a size which after body 2 has reached surface 34 as shown in FIG. 2 gravity will cause float 5 to push piston head 3 downward into the original position whereby retention means 24 will then be activated fixing the position of float 5 with respect to body 2 as shown in FIG. 2 so that the cycle can be repeated.

The vertical cycling of body 2 causes line 29 to move up and down so as to turn a flywheel of otherwise translate the force to the desired device.

There are, of course, other obvious alternate embodiments not specifically shown, but which are intended to be included in the scope of the invention, as defined by the following claims.

What I claim is:
1. A motor utilizing buoyancy forces as a source of the energy to generate power to a power receiving means comprising:
 (a) an enclosed hollow body positioned in a pool of liquid, said body having an opening in the upper portion of its vertical wall and a second opening in the lower portion of its vertical wall and a third opening in its bottom surface,
 (b) a piston means co-axially positioned in said hollow body comprising:
  (i) a piston head vertically movable along said vertical wall in sealing contact to form an upper cavity and a lower cavity within said body,
  (ii) a piston shaft attached at one end to said piston head and extending upward through the upper surface of said hollow body and being of sufficient length to allow said piston head to extend below said second opening, and
  (iii) a float attached to the other end of said piston shaft outside of said hollow body and having a flooding cavity and having a flooding opening and having a draining opening connecting said flooding cavity with said pool of fluid, said upper and lower cavities of said hollow body being adjustable in size upon the vertical movement of said piston head, said upper cavity when at its maximum size providing sufficient fluid displacement to result in said hollow body having a positive buoyancy when said flooding cavity is filled with said fluid,
 (c) a valve assembly operatively connected to said second opening, said flooding opening and said draining opening to independently open and close said second opening, said flooding opening and said draining opening,
 (d) a first locking means attached to said hollow body to lock and unlock said hollow float in position relative to said hollow body at a pre-determined time,
 (e) a second locking means attached to said hollow body to lock and unlock said hollow body in position relative to the bottom of said pool of liquid at a second pre-determined time,
 (f) a flexible hose attached at one end to said third opening and having its opposite end extending above the pool of liquid to allow the air to flow to and from said lower cavity to the atmosphere above said pool of liquid, and
 (g) a flexible line attached at one end to the bottom of said hollow body and extending toward said bottom of said pool of liquid and attached at its opposite end to said power receiving means.

* * * * *